(12) United States Patent
Yu

(10) Patent No.: US 10,359,668 B2
(45) Date of Patent: Jul. 23, 2019

(54) DISPLAY DEVICE AND BACKLIGHT MODULE

(71) Applicant: Innolux Corporation, Miao-Li County (TW)

(72) Inventor: Wen-Shen Yu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 74 days.

(21) Appl. No.: 15/613,363

(22) Filed: Jun. 5, 2017

(65) Prior Publication Data

US 2017/0371206 A1    Dec. 28, 2017

(30) Foreign Application Priority Data

Jun. 27, 2016  (CN) .......................... 2016 1 0481735

(51) Int. Cl.
*G02F 1/1335*    (2006.01)
*G02B 6/293*    (2006.01)
*F21V 8/00*    (2006.01)

(52) U.S. Cl.
CPC ..... *G02F 1/133606* (2013.01); *G02B 6/0053* (2013.01); *G02B 6/0065* (2013.01); *G02B 6/0088* (2013.01); *G02B 6/29368* (2013.01); *G02F 2001/133607* (2013.01)

(58) Field of Classification Search
CPC ... G02F 1/133606; G02F 2001/133607; G02B 6/0053; G02B 6/0088; G02B 6/29368; G02B 6/0065
See application file for complete search history.

(56) References Cited

U.S. PATENT DOCUMENTS

| 2010/0195315 | A1* | 8/2010 | Ohkawa | G02B 6/0016 362/97.1 |
| 2011/0292302 | A1* | 12/2011 | Park | G02B 19/0071 348/739 |
| 2013/0215600 | A1* | 8/2013 | Lee | G02F 1/133603 362/97.1 |

* cited by examiner

*Primary Examiner* — Huyen L Ngo
(74) *Attorney, Agent, or Firm* — McClure, Qualey & Rodack, LLP

(57) ABSTRACT

A display device including a display panel and a backlight module is provided. The backlight module is correspondingly disposed below the display panel and includes light-emitting elements providing light beams and disposed on a circuit board, lens units each being disposed on a corresponding light-emitting element and having a concave inside surface covering the corresponding light-emitting element and a convex outside surface covering the concave inside surface, and an inverse prism sheet disposed between the lens units and the display panel, and the inverse prism sheet having inverse prisms with a vertex corner. At least a portion of the light beams emitted from the convex outside surface each has a predetermined light-emitting angle $\theta_o$ larger than 30 degrees and less than 90 degrees. The backlight module has a height of cavity D being a distance between the vertex corner and the circuit board, and 10 $\mu m \leq D < 30$ mm.

20 Claims, 2 Drawing Sheets

DISPLAY DEVICE AND BACKLIGHT MODULE

This application claims the benefit of People's Republic of China application Serial No. 201610481735.X, filed Jun. 27, 2016, the subject matter of which is incorporated herein by reference.

BACKGROUND

Technical Field

One embodiment of the disclosure relates to a display device and a backlight module, and more particularly to the display device having a thin direct-type backlight module.

Description of the Related Art

The type of display device is very diverse. For the most common liquid crystal display (LCD) device, since the LCD panel itself is not self-luminous, the backlight module must be used as an auxiliary. The type of backlight module may be divided into direct type and edge type, wherein the light-emitting element of the direct-type backlight module is disposed below the LCD panel.

However, typical direct-type backlight module must be provided with a sufficiently large height of cavity, which makes the direct-type backlight module difficult to reduce its thickness.

SUMMARY

One embodiment of the disclosure is directed to a display device having lens units, wherein at least a portion of the light beams are emitted at a predetermined light-emitting angle by the lens units. Then, most of the light beams are guided to travel forward to a display panel by the inverse prism sheet. Thus, the height of cavity of the backlight module is reduced. Meanwhile, it can also achieve high brightness or high dynamic range (HDR).

According to one aspect of the present disclosure, a display device is provided. The display device includes a display panel and a backlight module. The backlight module is correspondingly disposed below the display panel and includes a plurality of light-emitting elements, a plurality of lens units and an inverse prism sheet. The light-emitting elements provide a plurality of light beams and are disposed on a circuit board. The plurality of lens units are respectively disposed on a correspondingly light-emitting element and each has a concave inside surface covering the corresponding light-emitting element and a convex outside surface covering the concave inside surface. Of at least a portion of the light beams emitted from the convex outside surface, each has a predetermined light-emitting angle $\theta_o$, wherein the predetermined light-emitting angle $\theta_o$ is larger than 30 degrees and less than 90 degrees. The inverse prism sheet is disposed between the lens units and the display panel, and has a plurality of inverse prisms, each of the inverse prisms having a vertex corner. The backlight module has a height of cavity D, D is a distance between the vertex corner and the circuit board, and 10 $\mu m \leq D < 30$ mm.

According to another aspect of the present disclosure, a backlight module is provided. The backlight module includes a circuit board, a plurality of light-emitting elements, a plurality of lens units and an inverse prism sheet. The plurality of light-emitting elements provide a plurality of light beams and are disposed on the circuit board. The plurality of lens units each being disposed on a correspondingly light-emitting element of the light-emitting elements and having a concave inside surface covering the corresponding light-emitting element and a convex outside surface covering the concave inside surface. At least a portion of the light beams emitted from the convex outside surface each has a predetermined light-emitting angle $\theta_o$, and the predetermined light-emitting angle $\theta_o$ is larger than 30 degrees and less than 90 degrees. The inverse prism sheet is disposed on the lens units, the inverse prism sheet has a plurality of inverse prisms, and each of the inverse prisms has a vertex corner. The backlight module has a height of cavity D being a distance between the vertex corner and the circuit board, and 10 $\mu m \leq D < 30$ mm.

The above and other aspects of the disclosure will become better understood with regard to the following detailed description of the embodiment(s). The following description is made with reference to the accompanying drawings.

DETAILED DESCRIPTION

Figure 1:
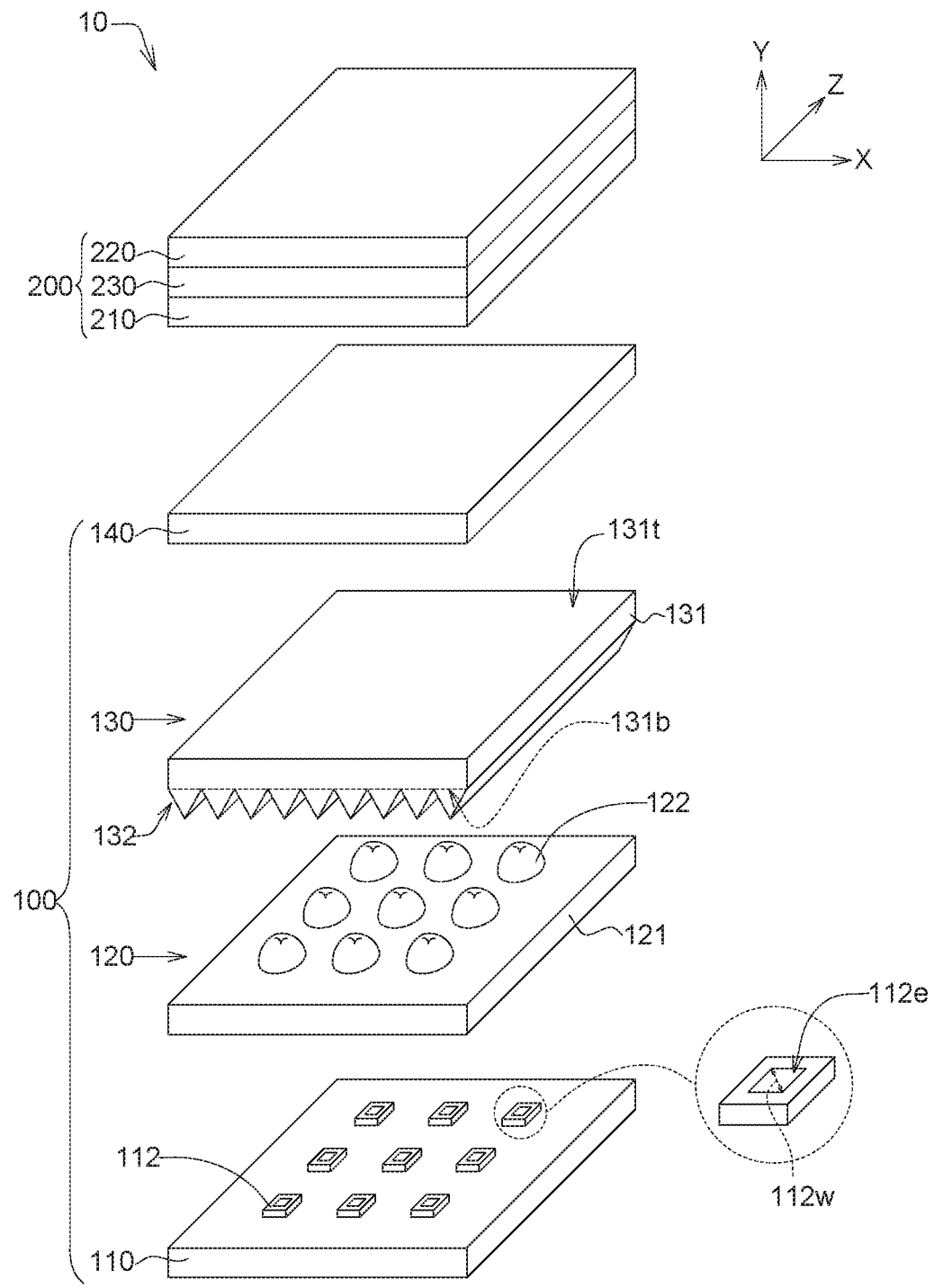
FIG. 1 shows a schematic diagram of a display device according to one embodiment of the present disclosure.

Embodiments of the present disclosure are directed to a display device having a direct-type backlight module. The backlight module includes a plurality of lens units and an inverse prism sheet. At least a portion of the light beams emitted from the light-emitting elements are emitted at a substantially identical light-emitting angle by the plurality of lens units. Then, most of the plurality of light beams are guided to travel forward to the display panel by the inverse prism sheet.

It should be noted that although the present disclosure does not illustrate all possible embodiments, other embodiments not disclosed in the present disclosure are still applicable. Moreover, the dimension scales used in the accompanying drawings are not based on actual proportion of the product. Therefore, the specification and drawings are used for explaining and describing the embodiment only, not for limiting the scope of protection of the present disclosure. Furthermore, descriptions of the embodiments, such as detailed structures, manufacturing procedures and materials, are used for exemplification purpose only, not for limiting the scope of protection of the present disclosure. Suitable modifications or changes can be made to the structures and procedures of the embodiments to meet actual needs without breaching the spirit of the present disclosure. In the following description, identical or similar reference numerals are used to indicate identical or similar elements.

Referring to FIG. 1, a schematic diagram of a display device 10 according to one embodiment of the present disclosure is shown. The display device 10 may include a backlight module 100 and a display panel 200, both of which are disposed opposite to each other. The display panel 200 may include a lower substrate 210, an upper substrate 220 and a display medium layer 230, and the display medium layer 230 is disposed between the lower substrate 210 and the upper substrate 220. In the case that the display panel 200 is a liquid crystal display panel, the display medium layer 230 is a liquid crystal layer which may be driven by a voltage to change light transmittance. The backlight module 100 is, for example, a direct-type backlight module, and may include a circuit board 110, a plurality of light-emitting elements 112, an optical lens film 120, an inverse prism sheet 130 and an optical film group 140.

The plurality of light-emitting elements 112 are, for example, light-emitting diodes (LEDs), and disposed on the circuit board 110. Each of the plurality of light-emitting elements 112 has a light-emitting surface 112e for providing a plurality of light beams. In one embodiment, the light-emitting surfaces 112e are disposed on the circuit board 110, and may be arranged in an array, but the present disclosure is not limited thereto.

The optical lens film 120 is disposed above the circuit board 110, and may include a plurality of lens units 122. Each of the plurality of light-emitting elements 112 is disposed within a corresponding lens unit 122, thereby producing a corresponding optical effect, such as changing the light-emitting angle of the emitted light. In one embodiment, the lens units 122 are collectively formed on a transmissive film 121, so as to integrally form the optical lens film 120. During production, the transmissive film 121 may cover the circuit board 110 and each of the plurality of lens units 122 covers the corresponding light-emitting element 112. In another embodiment, each of the plurality of lens units 122 may be directly combined together with the corresponding light-emitting element 112 without using the transmissive film 121.

The inverse prism sheet 130 is disposed above the optical lens film 120 to guide the light beams emitted from the plurality of lens units 122 toward the forward direction (i.e., the direction parallel to Y axis). The inverse prism sheet 130 may have a light transmissive substrate 131 and a plurality of inverse prisms 132. The light transmissive substrate 131 has a light-emitting surface 131t and a bottom surface 131b, both of which are disposed opposite to each other. The plurality of inverse prisms 132 are distributed over and protrude from the bottom surface 131b, and extend along the direction parallel to Z axis. Each of the plurality of inverse prisms 132 may be formed into an isosceles prism.

The optical film group 140 is, for example, a diffusion sheet, a prism sheet, a polarizer and its associated combination of components. The optical film group 140 is disposed between the inverse prism sheet 130 and the display panel 200, which can improve the optical properties of the light beams emitted from the inverse prism sheet 130 for different purposes. For instance, the optical film group 140 may have a diffusion sheet only. In one embodiment, the diffusion sheet may have haze between 40% and 100%. In another embodiment, the diffusion sheet may have haze between 80% and 100%. In one embodiment, the diffusion sheet may be formed of a pressure sensitive adhesive (PSA), wherein the inverse prism sheet 130 is attached to the lower substrate 210 of the display panel 200 by the PSA. In such case, diffusion particles are filled in the PSA to produce appropriate haze. In another embodiment, the diffusion sheet may be a film additionally disposed between the inverse prism sheet 130 and the display panel 200.

Since the typical optical film group further includes a diffusion plate, the diffusion plate may be omitted from the present disclosure by disposing the lens units 122 and the inverse prism sheet 130 according to the above embodiment. Thus, it is possible to avoid the reflection loss of light beams, which may easily happen when the incident angle of the light beams entering the diffusion plate is excessively large, resulting in an unnecessary loss of brightness.

Figure 2:
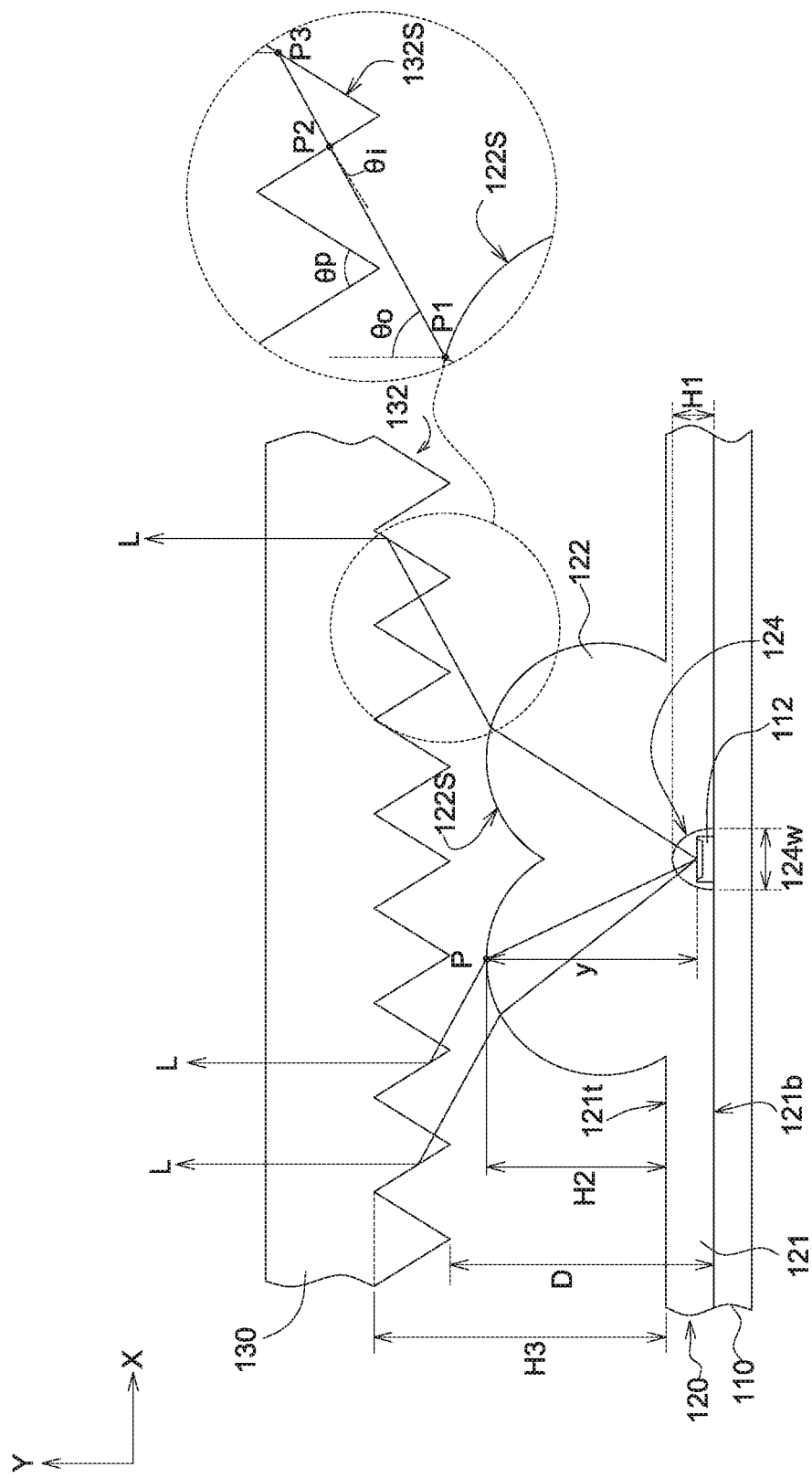
FIG. 2 shows a partially cross-sectional view of the backlight module of FIG. 1 and a partially enlarged view thereof.

Referring to FIG. 2, a partially cross-sectional view of the backlight module 100 of FIG. 1 and a partially enlarged view thereof are shown.

Each of the plurality of lens units 122 may have a convex outside surface 122S and a concave inside surface 124 formed at the bottom surface 121b of the transmissive film 121 and covering the corresponding light-emitting element 112. The convex outside surface 122S is formed at the top surface 121t of the transmissive film 121, and covers the concave inside surface 124. After the light beams L emitted by the light-emitting element 112 pass through the concave inside surface 124 and the convex outside surface 122S, at least a portion of the plurality of light beams L will be emitted at a substantially identical light-emitting angle (i.e., the predetermined light-emitting angle $\theta_o$). As illustrated in the partially enlarged view of FIG. 2, the light-emitting angle recited herein denotes an included angle between the light beam L emitted from the convex outside surface 122S and Y axis. Therefore, it is possible to modify the shape of the lens units 122 (such as modifying the radii of curvature of the convex outside surface 122S or the concave inside surface 124) to control the light-emitting angle at which the light beams L are emitted from the convex outside surface 122S (i.e., to control the predetermined light-emitting angle $\theta_o$ as illustrated in partially enlarged view of FIG. 2). Table 1 as shown below lists various embodiments, showing the percentage of the quantity of light beams, provided by the light-emitting elements 112, emitted at an angle within a range of ±1, ±2, ±5, ±6 and ±10 degrees of the predetermined light-emitting angle $\theta_o$ after passing through the lens units 122.

TABLE 1

| $\theta_o$ (degrees) | ±1 degrees | ±2 degrees | ±3 degrees | ±5 degrees | ±6 degrees | ±10 degrees |
| --- | --- | --- | --- | --- | --- | --- |
| 89.99 | 19.3% | 32.0% | 39.7% | 47.8% | 50.0% | 54.2% |
| 85.00 | 28.7% | 46.5% | 57.8% | 71.7% | 72.0% | 73.2% |
| 80.00 | 29.4% | 44.7% | 52.4% | 63.0% | 67.4% | 81.2% |
| 75.00 | 31.9% | 46.0% | 53.0% | 63.5% | 67.6% | 79.8% |
| 60.00 | 33.6% | 49.0% | 56.7% | 68.1% | 72.4% | 84.6% |
| 45.00 | 20.9% | 39.6% | 51.2% | 63.1% | 67.3% | 78.9% |

As shown in Table 1, more than at least 40% of the light beams provided by each of the plurality of light-emitting elements 112 may be emitted from the convex outside surface 122S at an angle within a range of ±5 degrees of the predetermined light-emitting angle $\theta_o$. For instance, if the predetermined light-emitting angle $\theta_o$ is 60 degrees, the light beams of the whole light beams provided by the light-emitting element 112 may be 68.1%, which will be emitted at an angle within a range of 60±5 degrees (i.e., an angle between 55 degrees and 65 degrees). At least a portion of the light beams are emitted at the predetermined light-emitting angle $\theta_o$ from the light-emitting element 112.

Furthermore, referring to FIG. 1 and FIG. 2, in one embodiment of the present disclosure, if the maximum length (i.e., the diagonal length 112w) of the light-emitting surface 112e of the light-emitting element 112 is larger than 1/1000 of the minimum width 124w or the height H1 of the concave inside surface 124 of the lens units 122, the plurality of light-emitting elements 112 necessarily have one single surface emitting light. On the other hand, if the maximum length 112w of the light-emitting surface 112e is less than 1/1000 of the minimum width 124w or the height H1 of the concave inside surface 124, the plurality of light-emitting elements 112 may have five surfaces emitting light (i.e., the other five surfaces except for the surface facing the circuit board 110) or one single surface emitting light.

Refer to the partially enlarged view of FIG. 2. When at least a portion of the plurality of light beams L are emitted from the convex outside surface 122S, the light beams L at position P1 are emitted at a predetermined light-emitting angle $\theta_o$. When the plurality of light beams are traveling to the inverse prism 132, the light beams L at position P2 enter the plurality of inverse prisms 132 at an incident angle $\theta_i$. Since the media that the light beams L travel through are different, the light beams L are refracted at position P2 through the plurality of inverse prisms 132. Particularly, in one embodiment of the present disclosure, it is possible to design a vertex angle $\theta_p$ of the vertex corner of the inverse prisms 132 according to the predetermined light-emitting angle $\theta_o$, such that when the light beams L enter the inverse prism 132 and encounter a surface 132S of the inverse prism 132, at least a portion of the plurality of light beams L are totally refracted and travel towards the display panel 200. Each of the plurality of inverse prisms 132 may have a vertex angle $\theta_p$, and the vertex angle $\theta_p$ and the predetermined light-emitting angle $\theta_o$ satisfy a mathematical expression (I):

$$\theta_o = 90° - \frac{\theta_P}{2} + \sin^{-1}\left[\frac{n_P}{n_i} \times \sin\left(\frac{3}{2}\theta_P - 90°\right)\right].$$

In the above mathematical expression (I), $n_i$ is a refractive index of a medium between the lens units 122 and the inverse prism sheet 130. The material of the medium is not particularly restricted in the present disclosure does, but it may be a transparent material having $n_i$ between 0.85 and 1.75. In another embodiment, the medium may be a polymer having $n_i$ between 1.25 and 1.38, or an adhesive having rubber as the matrix (such as PSA) or air. In addition, $n_p$ is a refractive index of the inverse prism sheet 130. The material of the inverse prism sheet 130 is not particularly restricted in the present disclosure does, but it may be a transparent material having $n_p$ between 1.45 and 1.65.

From the mathematical expression (I), if $n_i$ and $n_p$ are determined, the user may choose the predetermined light-emitting angle $\theta_o$ to obtain the vertex angle $\theta_p$ of the corresponding inverse prism 132. Herein, the suitable range of the predetermined light-emitting angle $\theta_o$ may be larger than 30 degrees and less than 90 degrees. In another embodiment, the suitable range of the predetermined light-emitting angle $\theta_o$ may be larger than 70 degrees and less than 90 degrees.

Table 2 as shown below lists various embodiments, showing the percentage of the quantity of light beams, of the whole light beams emitted from the convex outside surface 122S of the lens units 122 at each of the predetermined light-emitting angle $\theta_o$, emitted towards the display panel 200 at an angle within a range of ±1, ±2, ±3, ±5, ±6 and ±10 degrees of a frontal viewing angle (i.e., the direction parallel to Y axis) after guided through the inverse prism 132.

TABLE 2

| $\theta_o$ (degree) | viewing angle | | | | | |
|---|---|---|---|---|---|---|
| | ±1 degrees | ±2 degrees | ±3 degrees | ±5 degrees | ±6 degrees | ±10 degrees |
| 89.99 | 24.6% | 46.4% | 59.4% | 70.9% | 73.0% | 75.2% |
| 85.00 | 32.6% | 62.8% | 76.6% | 80.1% | 80.4% | 82.8% |
| 80.00 | 43.2% | 76.3% | 82.3% | 83.2% | 83.5% | 84.3% |
| 75.00 | 53.3% | 85.0% | 87.0% | 87.9% | 88.1% | 88.9% |
| 60.00 | 60.6% | 90.3% | 91.5% | 92.4% | 92.8% | 93.8% |
| 45.00 | 41.0% | 63.7% | 80.5% | 83.0% | 83.7% | 86.1% |

As shown in Table 2, after the light beams are guided through the inverse prisms 132, more than at least 50% of the whole light beams emitted from the convex outside surface 122S, and are emitted towards the display panel 200 at an angle within a range of ±3 degrees of a frontal viewing angle. For instance, if the predetermined light-emitting angle $\theta_o$ is 60 degrees, there may be 91.5% of the light beams emitted from the convex outside surface 122S and going through the inverse prisms 132 that will be emitted towards the display panel 200 at an angle within a range of ±3 degrees of the frontal viewing angle (i.e., within the range of ±3 degrees of the direction parallel to Y axis). That is, the vertex angle $\theta_p$ of the inverse prisms are designed according to the corresponding predetermined light-emitting angle $\theta_o$, and most of the light beams emitted from the convex outside surface 122S may be emitted forward.

In some embodiments, regarding the design of the plurality of lens units 122, when the concave inside surface 124 is a semicircle, a vertical distance y between the highest point P of the convex outside surface 122S and the corresponding light-emitting element 112 satisfies a functional relationship (II): $y = a_4 x^4 + a_3 x^3 + a_2 x^2 + a_1 x + a$.

In the above functional relationship (II), x is the predetermined light-emitting angle $\theta_o$, $a_4$, $a_3$, $a_2$, $a_1$ and a are constants, and $1.04 \times 10^{-6} < a_4 < 3.37 \times 10^{-6}$, $-2.65 \times 10^{-4} < a_3 < 8.76 \times 10^{-4}$, $1.87 \times 10^{-2} < a_2 < 6.60 \times 10^{-2}$, $-0.20 < a_1 < 0.99$ and $32.95 < a < 110.10$. For instance, $a_4$ may be a value between $1.04109561482879 \times 10^{-6}$ and $3.36105268139431 \times 10^{-6}$, $a_3$ may be a value between $-2.64672316421688 \times 10^{-4}$ and $8.75391470513076 \times 10^{-4}$, $a_2$ may be a value between $1.87991619758372 \times 10^{-2}$ and $6.59116752787121 \times 10^{-2}$, $a_1$ may be a value of between $-0.194248624349835$ and $0.985103308294265$, and a may be a value between $32.9545619503418$ and $110.098618919616$.

In some embodiment, the vertical distance y between the highest point P of the convex outside surface 122S and the corresponding light-emitting element 112 may satisfy the above functional relationship (II), such that at least a portion of the light beams provided by the light-emitting element 112 may be emitted at the predetermined light-emitting angle $\theta_o$ through the designed lens units 122.

The following description relating to some embodiment regarding the design of the lens unit 122 is made. Referring to FIG. 1 and FIG. 2, the design parameters of the lens unit 122 include H1, H2 and H3, wherein H1 is a distance between the highest point of the concave inside surface 124 and the circuit board 110, H2 is a distance between the highest point P of the convex outside surface 122S and the top surface 121t of the transmissive film 121, and H3 is a distance between the bottom surface 131b of the light transmissive substrate 131 (i.e., the bottom of the inverse prism 132) and the top surface 121t of the transmissive film 121. In one embodiment, if the predetermined light-emitting angle $\theta_o$ from the convex outside surface 122S is 60 degrees, H1 may be 10 μm, H2 may be 70.7 μm, and H3 may be 112.3 μm. In one embodiment, if the predetermined light-emitting angle $\theta_o$ from the convex outside surface 122S is 84 degrees, H1 may be 10 µm, H2 may be 70.2 µm, and H3 may be 103 µm. In one embodiment, if the predetermined light-emitting angle $\theta_o$ from the convex outside surface 122S is 89 degrees, H1 may be 10 µm, H2 may be 67 µm, and H3 may be 101 µm. However, the present disclosure is not limited to the above values; these values may be modified in view of the requirements of actual product. Furthermore, in some embodiments, the lens units 122 may be made by performing a roll-to-roll process, thereby further reducing the thickness.

According to the aforementioned arrangements of the lens units and the inverse prism sheet in the present disclosure, the height of cavity D may be controlled within a range of 10 µm≤D<30 mm, wherein the height of cavity is a distance between the vertex corner of the inverse prisms 132 and the circuit board 110. In another embodiment, the height of cavity D may be controlled within a range of 10 µm≤D<10 mm.

The backlight module 100 according to embodiments can not only be applied to the display device 10, but also be applied to any suitable luminous product, such as the lamp for a lighting product, depending on actual requirements.

According to the above description, the embodiments of the present disclosure at least have the advantages as recited below, for example. Through the design of the shape of the lens units and the specific vertex angle of the inverse prism sheet, it is possible to further reduce the height of cavity of the backlight module, and it is beneficial for a thin backlight module and the products using the same. In addition, the lens units may control at least a portion of the plurality of the light beams to be emitted at a predetermined light-emitting angle $\theta_o$. Then, most of the light beams emitted from the lens units may be emitted forward after being guided through the inverse prisms of the inverse prism sheet, thereby enhancing the light extraction efficiency or HDR effect. Besides, since the inverse prism sheet may be used to distribute the luminous energy, the diffusion plate may be omitted. Therefore, it may not only be beneficial for the thin backlight module, but also avoid the loss of brightness caused by the light beams which do not pass through the diffusion plate. In addition, a functional relationship for designing the lens units is also provided in the present disclosure. Through this functional relationship, at least a portion of the light beams may be emitted at a predetermined light-emitting angle $\theta_o$. Furthermore, a mathematical expression for the predetermined light-emitting angle $\theta_o$ and the vertex angle $\theta_p$ of the inverse prism is also provided in the present disclosure. The user may choose the predetermined light-emitting angle to obtain the vertex angle and the design of the corresponding inverse prism.

While the disclosure has been described by way of example and in terms of the embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display device comprising:
   a display panel; and
   a backlight module correspondingly disposed below the display panel and comprising:
   a plurality of light-emitting elements providing a plurality of light beams and disposed on a circuit board;
   a plurality of lens units each being disposed on a corresponding light-emitting element of the light-emitting elements and having a concave inside surface covering the corresponding light-emitting element and a convex outside surface covering the concave inside surface, wherein at least a portion of the light beams emitted from the convex outside surface each has a predetermined light-emitting angle $\theta_o$ larger than 30 degrees and less than 90 degrees; and
   an inverse prism sheet disposed between the lens units and the display panel, and the inverse prism sheet having a plurality of inverse prisms, each of the inverse prisms having a vertex corner;
   wherein the backlight module has a height of cavity D being a distance between the vertex corner and the circuit board, and 10 µm≤D<30 mm.

2. The display device according to claim 1, wherein more than at least 40% of the light beams provided by the light-emitting elements are emitted from the convex outside surface at an angle, within a range of ±5 degrees of the predetermined light-emitting angle.

3. The display device according to claim 1, wherein more than at least 50% of the light beams emitted from the convex outside surface are emitted from the inverse prism sheet at an angle within a range of ±3 degrees of a frontal viewing angle of the display panel.

4. The display device according to claim 1, wherein the vertex corner of each of the inverse prisms has a vertex angle $\theta_p$, and the vertex angle $\theta_p$ and the predetermined light-emitting angle $\theta_o$ satisfy a mathematical expression:

$$\theta_o = 90° - \frac{\theta_p}{2} + \sin^{-1}\left[\frac{n_P}{n_i} \times \sin\left(\frac{3}{2}\theta_P - 90°\right)\right],$$

wherein $n_i$ is a refractive index of a medium between the lens units and the inverse prism sheet, and $n_p$ is a refractive index of the inverse prism sheet.

5. The display device according to claim 1, wherein a refractive index of the inverse prism sheet is between 1.45 and 1.65.

6. The display device according to claim 1, further comprising a diffusion sheet disposed between the inverse prism sheet and the display panel.

7. The display device according to claim 6, wherein the diffusion sheet has haze between 40% and 100%.

8. The display device according to claim 6, wherein the diffusion sheet is formed of a pressure sensitive adhesive comprising diffusion particles.

9. The display device according to claim 1, wherein when the concave inside surface is a semicircle, a vertical distance y between a highest point of the convex outside surface and the corresponding light-emitting element satisfies a functional relationship: $y=a_4x^4+a_3x^3+a_2x^2+a_1x+a$, wherein x is the predetermined light-emitting angle $\theta_o$, $a_4$, $a_3$, $a_2$, $a_1$ and a are constants, and $1.04\times10^{-6}<a_4<3.37\times10^{-6}$, $-2.65\times10^{-4}<a_3<8.76\times10^{-4}$, $1.87\times10^{-2}<a_2<6.60\times10^{-2}$, $-0.20<a_1<0.99$ and $32.95<a<110.10$.

10. The display device according to claim 1, wherein the lens units are collectively formed on a transmissive film to integrally form an optical lens film.

11. A backlight module comprising:
    a circuit board;
    a plurality of light-emitting elements providing a plurality of light beams and disposed on the circuit board;

a plurality of lens units each being disposed on a corresponding light-emitting element of the light-emitting elements and having a concave inside surface covering the corresponding light-emitting element and a convex outside surface covering the concave inside surface, wherein at least a portion of the light beams emitted from the convex outside surface each has a predetermined light-emitting angle $\theta_o$ larger than 30 degrees and less than 90 degrees; and an inverse prism sheet disposed on the lens units and having a plurality of inverse prisms, each of the inverse prisms having a vertex corner;

wherein the backlight module has a height of cavity D being a distance between the vertex corner and the circuit board, and 10 µm≤D<30 mm.

12. The backlight module according to claim 11, wherein more than at least 40% of the light beams provided by the light-emitting elements are emitted from the convex outside surface at an angle within a range of ±5 degrees of the predetermined light-emitting angle.

13. The backlight module according to claim 11, wherein more than at least 50% of the light beams emitted from the convex outside surface are emitted from the inverse prism sheet at an angle within a range of ±3 degrees of a frontal viewing angle.

14. The backlight module according to claim 11, wherein the vertex corner of each of the inverse prisms has a vertex angle $\theta_p$, and the vertex angle $\theta_p$ and the predetermined light-emitting angle $\theta_o$ satisfy a mathematical expression:

$$\theta_o = 90° - \frac{\theta_P}{2} + \sin^{-1}\left[\frac{n_P}{n_i} \times \sin\left(\frac{3}{2}\theta_P - 90°\right)\right],$$

wherein $n_i$ is a refractive index of a medium between the lens units and the inverse prism sheet, and $n_p$ is a refractive index of the inverse prism sheet.

15. The backlight module according to claim 11, wherein a refractive index of the inverse prism sheet is between 1.45 and 1.65.

16. The backlight module according to claim 11, further comprising a diffusion sheet disposed on the inverse prism sheet.

17. The backlight module according to claim 16, wherein the diffusion sheet has haze between 40% and 100%.

18. The backlight module according to claim 16, wherein the diffusion sheet is formed of a pressure sensitive adhesive comprising diffusion particles.

19. The backlight module according to claim 11, wherein when the concave inside surface is a semicircle, a vertical distance y between a highest point of the convex outside surface and the corresponding light-emitting element satisfies a functional relationship: $y=a_4x^4+a_3x^3+a_2x^2+a_1x+a$, wherein x is the predetermined light-emitting angle $\theta_o$, $a_4$, $a_3$, $a_2$, $a_1$ and a are constants, and $1.04\times10^{-6}<a_4<3.37\times10^{-6}$, $-2.65\times10^{-4}<a_3<8.76\times10^{-4}$, $1.87\times10^{-2}<a_2<6.60\times10^{-2}$, $-0.20<a_1<0.99$ and $32.95<a<110.10$.

20. The backlight module according to claim 11, wherein the lens units are collectively formed on a transmissive film to integrally form an optical lens film.

* * * * *